United States Patent
Yu

(10) Patent No.: US 7,394,354 B2
(45) Date of Patent: Jul. 1, 2008

(54) TRAILER PRESENCE DETECTION SYSTEM AND METHOD

(75) Inventor: Jingsheng Yu, Northville, MI (US)

(73) Assignee: Robert Bosch GmbH (DE)

( * ) Notice: Subject to any disclaimer, the term of this patent is extended or adjusted under 35 U.S.C. 154(b) by 114 days.

(21) Appl. No.: 11/050,954

(22) Filed: Feb. 4, 2005

(65) Prior Publication Data
US 2006/0187008 A1    Aug. 24, 2006

(51) Int. Cl.
*G08B 21/00*   (2006.01)
*G62D 13/00*   (2006.01)

(52) U.S. Cl. .................... 340/431; 340/440; 340/665; 340/668; 280/442; 280/445

(58) Field of Classification Search .................. None
See application file for complete search history.

(56) References Cited

U.S. PATENT DOCUMENTS

| | | |
|---|---|---|
| 3,908,782 A | 9/1975 | Lang et al. |
| 4,023,863 A | 5/1977 | Sisson et al. |
| 4,023,864 A | 5/1977 | Lang et al. |
| 4,034,822 A | 7/1977 | Stedman |
| 4,232,910 A | 11/1980 | Snyder |
| 4,275,898 A | 6/1981 | Muste Llambrich |
| 4,697,817 A | 10/1987 | Jefferson |
| 4,706,984 A | 11/1987 | Esler et al. |
| 4,850,249 A * | 7/1989 | Kirstein ............... 477/97 |
| 5,011,170 A | 4/1991 | Forbes et al. |
| 5,139,374 A | 8/1992 | Holt et al. |
| 5,333,940 A | 8/1994 | Topfer |
| 5,348,331 A | 9/1994 | Hawkins |
| 5,380,072 A | 1/1995 | Breen |
| 5,707,071 A | 1/1998 | Prestidge et al. |
| 5,861,802 A | 1/1999 | Hungerink et al. |
| 6,223,114 B1 | 4/2001 | Boros et al. |
| 6,234,447 B1 | 5/2001 | Boyden et al. |
| 6,272,407 B1 | 8/2001 | Scholl |
| 6,311,111 B1 | 10/2001 | Leimbach et al. |
| 6,349,247 B1 | 2/2002 | Schramm et al. |
| 6,438,464 B1 | 8/2002 | Woywod et al. |
| 6,446,998 B1 | 9/2002 | Koenig et al. |
| 6,452,485 B1 | 9/2002 | Schutt et al. |
| 6,466,028 B1 | 10/2002 | Coppinger et al. |

(Continued)

FOREIGN PATENT DOCUMENTS

DE    EP 1477338 A2  *  11/2004

(Continued)

OTHER PUBLICATIONS

SAE Technical Paper Series, Parametric Study on Vehicle-Trailer Dynamics for Stability Control; SAE International, Warrendale, PA; Copyright 2003.

*Primary Examiner*—Julie Bichngoc Lieu
(74) *Attorney, Agent, or Firm*—Michael Best & Friedrich LLP

(57) ABSTRACT

A system and method of detecting a vehicle trailer. The method includes sensing a first vehicle condition that indicates a movement of the vehicle, and sensing a second vehicle condition that indicates an angle of the vehicle. The method also includes determining a disturbance from the movement and the angle of the vehicle, and detecting a trailer presence when the determined disturbance is above a threshold.

21 Claims, 4 Drawing Sheets

U.S. PATENT DOCUMENTS

| | | |
|---|---|---|
| 6,494,281 B1 | 12/2002 | Faye et al. |
| 6,501,376 B2 | 12/2002 | Dieckmann et al. |
| 6,523,911 B1 | 2/2003 | Rupp et al. |
| 6,553,284 B2 | 4/2003 | Holst et al. |
| 6,600,974 B1 | 7/2003 | Traechtler |
| 6,604,035 B1 | 8/2003 | Wetzel et al. |
| 6,636,047 B2 | 10/2003 | Arlt et al. |
| 6,655,710 B2 | 12/2003 | Lindell et al. |
| 6,756,890 B1 | 6/2004 | Lindell et al. |
| 2004/0246116 A1* | 12/2004 | Polzin ........................ 340/443 |
| 2005/0006946 A1 | 1/2005 | Traechtler et al. |
| 2005/0065694 A1 | 3/2005 | Nenninger |
| 2005/0125132 A1 | 6/2005 | Stumpp et al. |
| 2005/0206229 A1* | 9/2005 | Lu et al. ..................... 303/123 |
| 2006/0125313 A1* | 6/2006 | Gunne et al. .................. 303/7 |

FOREIGN PATENT DOCUMENTS

| | | |
|---|---|---|
| GB | 2402453 A | 8/2004 |

* cited by examiner

TRAILER PRESENCE DETECTION SYSTEM AND METHOD

BACKGROUND

Embodiments of the invention relate to a method and device for detecting the presence of a trailer or semi-trailer of a motor vehicle.

Stability is a primary concern for a vehicle towing a trailer, especially when the vehicle towing the trailer is traveling at high speed or making a turn. Since the trailer significantly affects the dynamics of the towing vehicle, many control systems use techniques to improve the stability of the towing vehicle especially when a trailer is present. For example, systems such as anti-lock braking system ("ABS"), tire control system ("TCS"), and vehicle dynamics control ("VDC") are configured to perform different functions for the vehicle and the trailer in order to improve stability. Furthermore, the towing vehicle can better control its transmission if the presence of a trailer is known.

Existing methods used to detect the presence of a trailer generally require additional sensors and hardware to be installed on the towing vehicle. In some cases, the vehicle can require additional hardware including electronic circuits and relays, which can increase the cost of the vehicle and/or trailer. In some other cases, the towing vehicle uses a current measurement of its brake lights to detect the trailer presence. In some other cases, signals from an electronic stability program ("ESP") are used to detect a trailer oscillation (the program assumes that a trailer is present).

SUMMARY

Accordingly, there is a need for improved methods and systems for detecting the presence of a trailer or semi-trailer. The following summary sets forth certain embodiments of such methods and systems. However, it does not set forth all such embodiments and should in no way be construed as limiting of any particular embodiment.

Generally, according to an embodiment of the invention, a hitch force is first estimated based on a vehicle dynamics model using parameters such as steering angle, yaw rate, vehicle speed, and lateral acceleration signals. These parameters are generally available within a vehicle control system such as an ESP system. Based on the estimated hitch force, a detection algorithm is then used to detect whether a trailer is connected to the vehicle.

In another form, the invention provides a method of detecting a vehicle trailer. The method includes sensing a first vehicle condition that indicates a movement of the vehicle, and sensing a second vehicle condition that indicates an angle such as a steered angle of the vehicle. The method also includes determining a disturbance from the movement and the angle of the vehicle, and detecting a trailer presence when the determined disturbance is above a threshold.

In another form, the invention provides a system for detecting a vehicle trailer. The system includes a plurality of sensors that sense vehicle conditions that can include a movement and a speed of the vehicle, and an estimator that estimates a disturbance based on the movement of the vehicle and the speed of the vehicle. The system also includes a detector that detects a trailer presence when the estimated disturbance is above a threshold.

In another form, the invention provides a method of detecting a vehicle trailer. The method includes modeling a plurality of dynamics of the vehicle, and determining a plurality of hitch force values from the modeled dynamics of the vehicle. The method also includes summing the determined hitch force values, and detecting a trailer presence when the sum of the hitch force values exceeds a threshold.

In another form, the invention provides a system for detecting a vehicle trailer. The system includes a means for modeling a plurality of dynamics of the vehicle, and a means for determining a plurality of hitch force values from the means for modeling. The system includes a means for determining a sum of the determined hitch force values, and a means for detecting a trailer presence when the sum exceeds a threshold.

Other features and advantages of the invention will become apparent to those skilled in the art upon review of the following detailed description, claims, and drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

As should also be apparent to one of ordinary skill in the art, the systems shown in the figures are models of what actual systems might be like. As noted, many of the modules and logical structures described are capable of being implemented in software executed by a microprocessor or a similar device or of being implemented in hardware using a variety of components including, for example, application specific integrated circuits ("ASICs"). Terms like "processor" may include or refer to both hardware and/or software. Furthermore, throughout the specification capitalized terms are used. Such terms are used to conform to common practices and to help correlate the description with the coding examples, equations and/or drawings. However, no specific meaning is implied or should be inferred simply due to the use of capitalization. Thus, the claims should not be limited to the specific examples or terminology or to any specific hardware or software implementation or combination of software or hardware.

Embodiments of the invention relate to a method and system for detecting the presence of a trailer or semi-trailer of a motor vehicle. In one embodiment, a hitch force is considered a disturbance to a model describing a plurality of towing vehicle dynamics. The hitch force is estimated based on the model.

In a specific embodiment, a first vehicle condition that indicates a movement of the vehicle is sensed. A second vehicle condition that indicates an angle of the vehicle is also sensed. A hitch force is then estimated from the movement and the angle of the vehicle. The presence or absence of a trailer is then detected based on the estimated hitch force.

Figure 1:
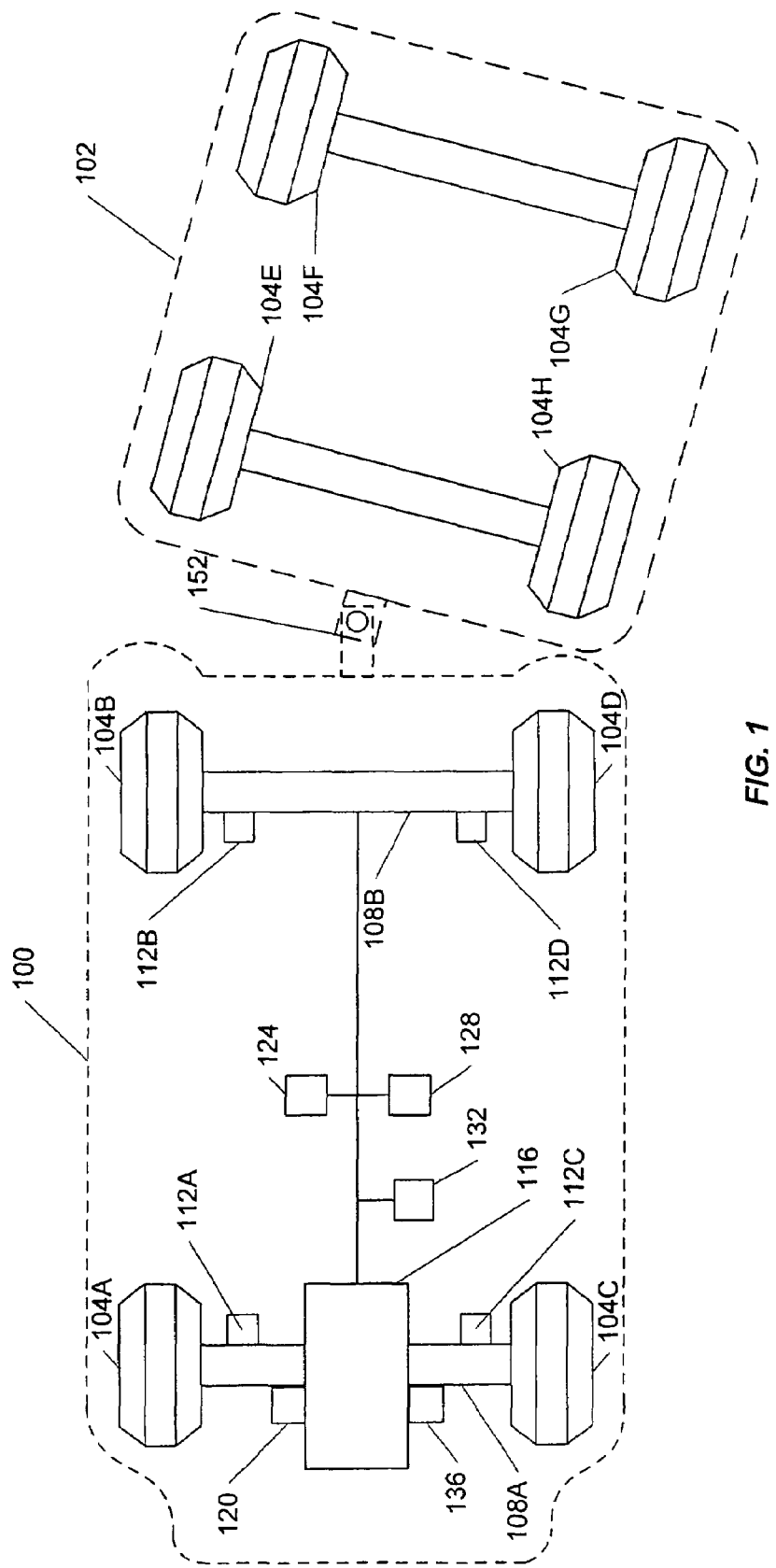
FIG. 1 shows a schematic plan view of a vehicle.

FIG. 1 shows a schematic plan view of a towing vehicle 100 towing a trailer 102. The towing vehicle 100 has four wheels 104A, 104B, 104C and 104D, and the trailer 102 has four wheels 104E, 104F, 104G and 104H. In some other embodiments, the vehicle 100 and the trailer 102 can have other numbers of wheels. Furthermore, the trailer 102 can be a semi-trailer, a full-size trailer, a boat trailer, a camper, or the like. The wheels 104A, 104B, 104C and 104D are connected to two axles 108A and 108B, as shown. The four wheels are monitored by a plurality of wheel speed sensors 112A, 112B, 112C, and 112D. The wheel speed sensors 112A, 112B, 112C, and 112D are coupled to an electronic processing unit ("ECU") 116. The vehicle 100 also includes other sensors such as a steering angle sensor 120, a yaw rate sensor 124, and a lateral acceleration sensor 128. The wheel speed sensors 112A, 112B, 112C, and 112D, the steering sensor 120, the yaw rate sensor 124, and the lateral acceleration sensor 128 are shown as individual sensors generically. These sensors 112A, 112B, 112C, 112D, 120, 124, and 128 can also include multiple sensors in a plurality of sensor arrays, for example, that may be coupled to the ECU 116. Other sensor types such as body slip angle sensor 132, and an engine torque sensor 136 can also be used in the vehicle 100. The vehicle 100 also includes a hitch 152 coupled to the trailer 102.

In one embodiment, a hitch detection system 160 (FIG. 2) is embedded in the ECU 116 and used to detect the presence of a trailer, detailed hereinafter. The hitch detection system 160 receives its input from a towing vehicle sensor array 168. In some embodiments, the towing vehicle sensor array 168 includes wheel speed sensors 112A, 112B, 112C, and 112D, the steering angle sensor 20, the yaw rate sensor 124, the lateral acceleration sensor 128, and the like. In other embodiments, the towing vehicle sensor array 168 can also include the body slip angle sensor 132.

In one embodiment, the towing vehicle sensor array 168 detects and monitors some specific conditions of the vehicle 100. For example, the sensors 112A, 112B, 112C, and 112D are used to sense a condition of the vehicle that is indicative of a movement or a speed of the towing vehicle 100. Sensed conditions are then transduced and converted into calibrated signals that are indicative of acceleration of the vehicle 100. If the sensors 112A, 112B, 112C, and 112D are equipped with any calibration circuitry or microprocessor therein, the speed can be converted internally to a calibrated form in the sensors 112A, 112B, 112C, and 112D. Otherwise, the conditions can be converted into calibrated signals by other external processes in a manner known in the art. Furthermore, other sensors such as the steering sensor 120, the yaw rate sensor 124, and the lateral acceleration sensor 128 are used to detect or sense events such as movements, such as side-to-side movements, side-to-side acceleration of the towing vehicle, and angles of the movements. Collectively, values of the signals outputted by the sensors 112A, 112B, 112C, 112D, 120, 124, 128, or by the sensor array 168 are referred to as sensed values, or values, hereinafter. As a result, the ECU 116 and the hitch detection system 160 can use data from existing sensors available in a standard control system to determine a presence of a trailer. In this way, additional hardware or sensors are unnecessary. Furthermore, since only data from the towing vehicle 100 needs to be used, data from the trailer is then also unnecessary.

Figure 2:
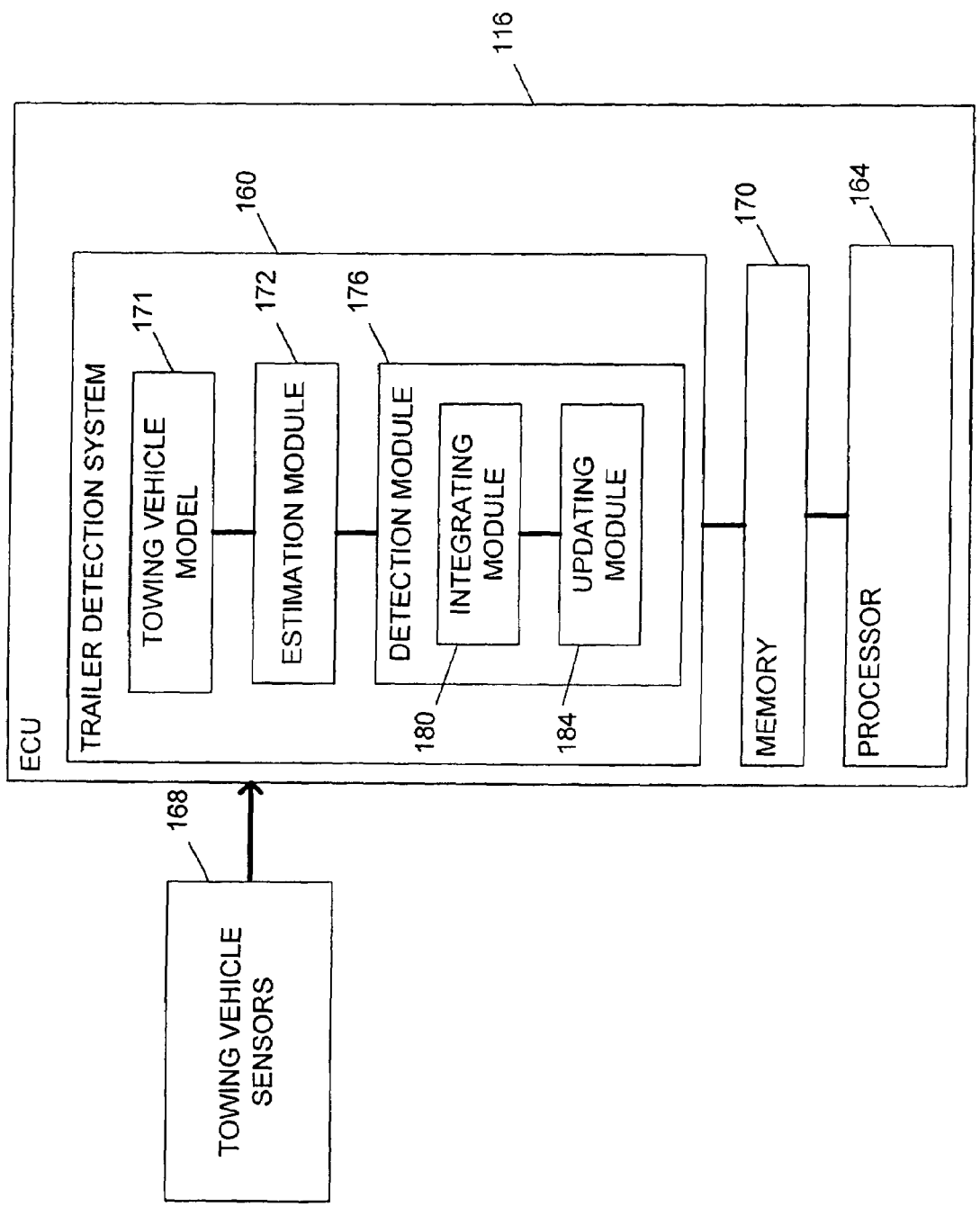
FIG. 2 shows a block diagram of a hitch force estimation system that can be applied in the vehicle of FIG. 1 according to an embodiment of the invention.

The ECU 116 includes a processor 164 that receives the values from the towing vehicle sensor array 168. The processor 164 then processes the values from the towing vehicle sensor array 168 according to a program stored in a memory 170. Although the memory 170 is shown as being external to the processor 164, the memory 170 can also be internal to the processor 164. Similarly, although the hitch detection system 160 is shown as being external to the processor 164, the hitch detection system 160 can also be internal to the processor 164, or integrated in other control systems of the vehicle 100. Furthermore, the processor 164 can be a general-purpose micro-controller, a general-purpose microprocessor, a dedicated microprocessor or controller, a signal processor, an application-specific-integrated circuit ("ASIC"), or the like. In some embodiments, the hitch detection system 160 and its functions described are implemented in a combination of firmware, software, hardware, and the like. To be more specific, as illustrated in FIG. 2, the processor 164 communicates with the hitch detection system 160 that is drawn assuming that these modules are implemented in hardware. However, the functionality of these modules can be implemented in software, and that software can, for example, be stored in the memory 170 and executed by the processor 164.

Particularly, FIG. 2 shows a block diagram structure of a hitch detection system 160. The hitch detection system 160 includes a towing vehicle model 171, an estimation module 172 and a detection module 176. The towing vehicle model 171 formulates a plurality of vehicle dynamics from the parameters that can be obtained from the towing vehicle sensor array 168. In some embodiments, the vehicle dynamics include a steering angle ($\delta_f$), a yaw rate ($\dot{\psi}$), a lateral acceleration ($a_y$), a wheel speed (v), a front wheel torque ($T_f$) and a rear wheel torque ($T_r$), and the like. If the towing vehicle 100 (see FIG. 1) is hauling a trailer such as the trailer 102, the trailer 102 can exert a hitch force ($F_{yh}$) on the towing vehicle 100. The hitch detection system 160 then uses the towing vehicle model 171, and the estimation module 172 to estimate the hitch force or a hitch force estimate ($\hat{F}_{yh}$) based on some or all of the formulated dynamics from the towing vehicle model 171. The hitch force estimate ($\hat{F}_{yh}$) and some of the formulated dynamics such as a front wheel torque ($T_f$) is subsequently used in the detection module 176 to detect or determine whether a trailer is being hauled by the towing vehicle. In some embodiments, the detection module 176 includes a hitch force updating module 184 to update the estimated hitch force ($\hat{F}_{yh}$) based on a plurality of factors that can affect the hitch force estimate ($\hat{F}_{yh}$), detailed hereinafter. The detection module 176 also includes a summing or integrating module 180 to obtain an absolute value of the hitch force estimate ($\hat{F}_{yh}$), detailed hereinafter. In the embodiment shown, the hitch force ($F_{yh}$) is considered as a system disturbance representing the total trailer dynamics.

Figure 3:
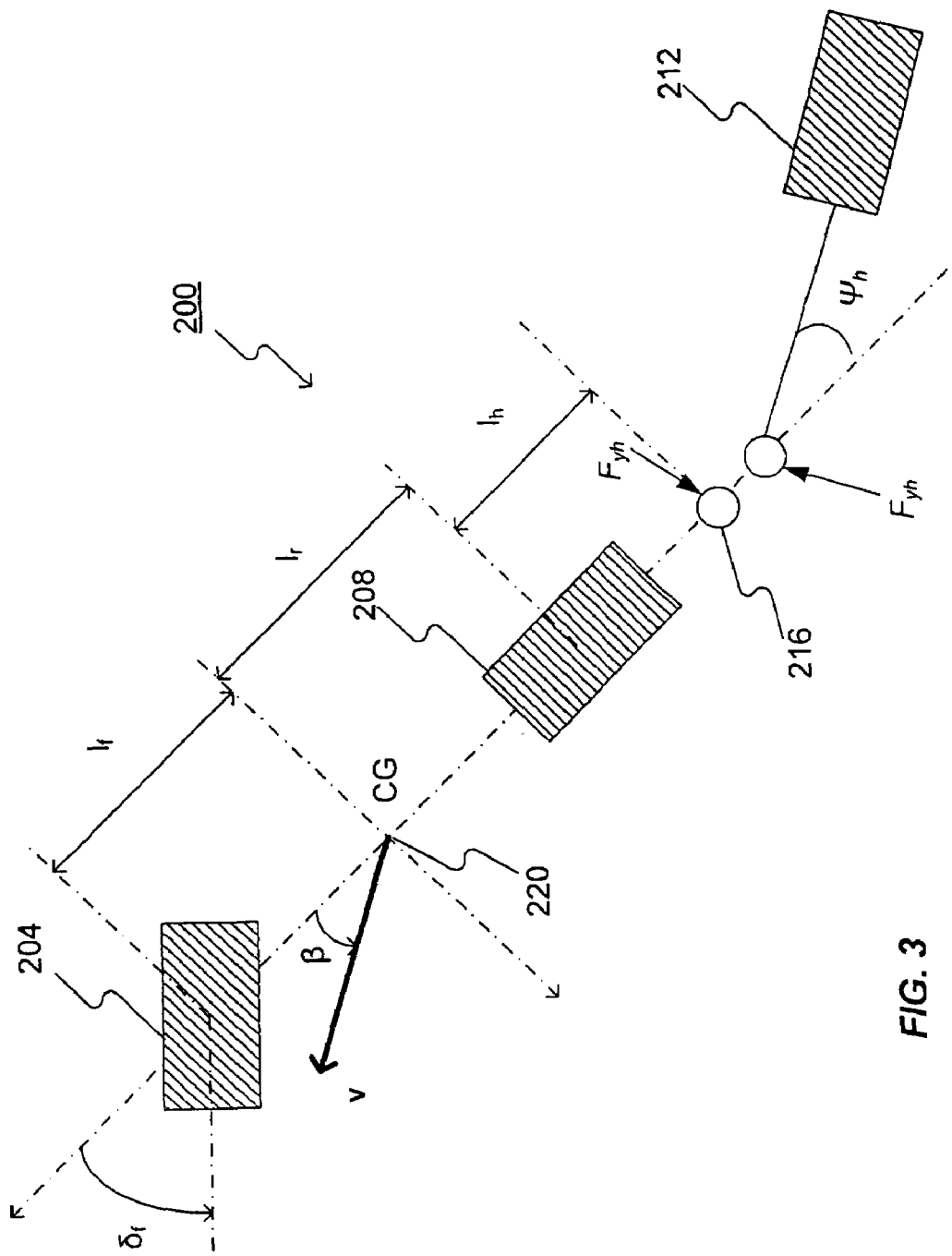
FIG. 3 shows a free-body diagram of a vehicle towing a trailer.

FIG. 3 shows an exemplary free-body diagram 200 of a vehicle towing a trailer that can be used as a model for the towing vehicle model 171. In the free-body diagram 200, the towing vehicle is represented by a combination of a front wheel 204 and a rear wheel 208, and the trailer is represented by a trailer wheel 212. The trailer is connected to the towing vehicle at a hitch 216. The hitch force ($F_{yh}$) is shown at the hitch 216 as an acting force as well as a reacting force. The free-body diagram 200 also shows that the towing vehicle is traveling with a wheel speed of v at a body slip angle of $\beta$, that is, the towing vehicle (represented by the front wheel 204 and the rear wheel 208) is turning at a steering angle of $\delta_f$. The distances from a center of gravity ("CG") 220 of the towing vehicle to the front wheel 204 and to the rear wheel 208 are $l_f$ and $l_r$, respectively. The distance from the rear wheel 208 to the hitch 216 is $l_h$. The angle between the trailer wheel 212 and an axis joining the hitch 216 to the rear wheel 208 is a hitch articulation angle $\psi_h$. In this way, when the towing vehicle makes a turn or is subjected to a lateral force which generates nonzero readings from the towing vehicle sensor array 168, a lateral hitch force ($F_{yh}$) or the hitch force estimate ($\hat{F}_{yh}$) can be determined.

Using the exemplary free-body diagram 200 as shown in FIG. 3, a towing vehicle model (used for the towing vehicle model 171) can be set up. For example, the towing vehicle model can consider the hitch force ($F_{yh}$) as an additional dynamic component applied to the towing vehicle 100. In this way, an exact or explicit description of the trailer dynamics can be unnecessary to the towing vehicle model. In other embodiments, all or a subset of the trailer dynamics can also be used in the towing vehicle model. Furthermore, in this way, since the parameters as shown in FIG. 3 are generally available in the towing vehicle as part of a stability control program via a plurality of sensor signals acquired around the towing vehicle, additional hardware is unnecessary. When the towing vehicle model has been established, the hitch force estimate ($\hat{F}_{yh}$) can be determined based on the dynamics including the yaw rate, the steering angle, the lateral acceleration, the body slip angle, and the vehicle speed of the towing vehicle using the sensor signals as follows.

In some embodiments, the towing vehicle dynamics are represented by a linear bicycle model as shown in EQN. (1):

$$\begin{pmatrix} \dot{\beta} \\ \ddot{\psi} \end{pmatrix} = \begin{pmatrix} -\frac{C_f + C_r}{Mv} & -1 - \frac{C_f l_f - C_r l_r}{Mv^2} \\ -\frac{C_f l_f - C_r l_r}{I_z} & -\frac{C_f l_f^2 - C_r l_r^2}{I_z v} \end{pmatrix} \begin{pmatrix} \beta \\ \dot{\psi} \end{pmatrix} + \begin{pmatrix} \frac{C_f}{Mv} \\ \frac{C_f l_f}{I_z} \end{pmatrix} \delta_f + \begin{pmatrix} \frac{1}{Mv} \\ -\frac{l_r + l_h}{I_z} \end{pmatrix} F_{yh} \quad (1)$$

wherein the variable $\beta$ is a body slip angle, the variable $\psi$ is a yaw rate, the steering angle $\delta_f$ is a system input, M is a mass of the vehicle, v is a longitudinal speed of the towing vehicle, the variable $I_z$ is the moment of inertia of the towing vehicle around CG 220, $C_f$, $C_r$ are cornering stiffness of front and rear tires, respectively, $l_f$ and $l_r$ are the distances from the front and rear axle or wheels 204, 208 to CG 220, and $l_h$ is the length from the rear axle or wheel to the hitch 216. In some other embodiments, other towing vehicle models such as two-track model, non-linear bicycle model, single-track model and the like can also be applied.

In general, the vehicle speed (v) is calculated from the wheel speed sensor signals of all four wheels. Of course, the wheel speed signals from a different number of wheels can also be used depending on the particular application. Thereafter, assuming $\hat{\beta}$ and $\hat{\psi}$ are estimates of the body slip angle $\beta$ and the yaw rate $\psi$, respectively, and measuring $\beta$ and $\psi$, the hitch force estimate ($\hat{F}_{yh}$) can be determined as shown in EQN. (2).

$$\hat{F}_{yh}(t) = \hat{F}_{yh}(t-1) + K_1(v)(\beta - \hat{\beta}) + K_2(v)(\psi - \hat{\psi}). \quad (2)$$

EQN. (2) shows that the hitch force estimate ($\hat{F}_{yh}$) at time t can be dependent on the hitch force estimate ($\hat{F}_{yh}$) at a previous time instant, a body slip angle $\beta$, a body slip angle estimate $\hat{\beta}$, a yaw rate $\psi$, and a yaw rate estimate $\hat{\psi}$. Particularly, in some embodiments, EQN. (2) also shows that when the body slip angle $\beta$ is equal to the body slip angle estimate $\hat{\beta}$, and the yaw rate $\psi$ is equal to the yaw rate estimate $\hat{\psi}$, the hitch force estimate ($\hat{F}_{yh}$) converges into a specific value. The estimation of the hitch force ($F_{yh}$) can be considered accurate when the hitch force estimate ($\hat{F}_{yh}$) converges. In some embodiments, $\hat{\beta}$ and $\hat{\psi}$ are given by EQN. (3) as follows.

$$\hat{\beta}(t) = \hat{\beta}(t-1) + K_3(v)\hat{\beta}(t-1) + K_4(v)\hat{\psi} + K_9(v)(\beta - \hat{\beta}(t-1)) + K_{10}(v)(\psi - \hat{\psi}(t-1)) + K_5 \delta_f,$$

and $$\hat{\psi}(t) = \hat{\psi}(t-1) + K_6(v)\hat{\beta}(t-1) + K_7(v)\hat{\psi} + K_{11}(v)(\beta - \hat{\beta}(t-1)) + K_{12}(v)(\psi - \hat{\psi}(t-1)) + K_8 \delta_f \quad (3)$$

wherein $K_1(v)$, $K_2(v)$, $K_3(v)$, $K_4(v)$, $K_5(v)$, $K_6(v)$, $K_7(v)$, $K_8(v)$, $K_9(v)$, $K_{10}(v)$, $K_{11}(v)$, and $K_{12}(v)$ are coefficients. These coefficients can generally be derived from the dynamic model selected such as the model of EQN. (1), detailed hereinafter.

Similar to EQN. (2), values of the body slip angle estimate $\hat{\beta}$, and the yaw rate estimate $\hat{\psi}$ at time t depend on the values of the body slip angle estimate $\hat{\beta}$, and the yaw rate estimate $\hat{\psi}$ at a previous time instant, respectively, among other things. Furthermore, the values of the body slip angle estimate $\hat{\beta}$, and the yaw rate $\hat{\psi}$ at time t are also dependent on the differences between the estimates and the values from the respective sensors or from the towing vehicle sensor array 168. In some embodiments, if only the yaw rate $\psi$ from the yaw rate sensor 124 is available, $K_1(v)$ is set to 0. In some embodiments, if only the body slip angle $\beta$ from the body slip angle sensor 132 is available, $K_2(v)$ is set to 0. In some embodiments, the body slip angle $\beta$ can also be calculated from a lateral acceleration $a_y$ from the lateral acceleration sensor 128 by EQN. (4):

$$\dot{\beta} = \frac{a_y}{v} - \dot{\psi}. \quad (4)$$

Some exemplary values of $K_1(v)$, $K_2(v)$, $K_3(v)$, $K_4(v)$, $K_5(v)$, $K_6(v)$, $K_7(v)$, $K_8(v)$, $K_9(v)$, $K_{10}(v)$, $K_{11}(v)$, and $K_{12}(v)$ can be derived from EQN. (1) as follows.

$$K_1 = K_9 = K_{11} = 0 \quad (5)$$

$$K_2 = \frac{I_z M v}{-C_f(l_f + l_r + l_h) - C_r l_h} D$$

$$K_3 = -\frac{C_f + C_r}{Mv}, \quad K_4 = -1 - \frac{C_f l_f - C_r l_r}{Mv^2}, \quad K_5 = \frac{1}{Mv}$$

$$K_6 = -\frac{C_f l_f - C_r l_r}{I_z}, \quad K_7 = -\frac{C_f l_f^2 + C_r l_r^2}{I_z v}, \quad K_8 = \frac{l_f + l_h}{I_z}$$

$$K_{12} = E + K_3 + K_7$$

$$K_{10} = \frac{K_3 K_{12} - K_8 K_2 - K_3 K_7 + K_4 K_6}{K_6}$$

wherein D and E are adjustable parameters. In this case, only the yaw rate $\psi$ is used as a feedback measurement. In some embodiments, the value of D ranges from about −8000 to about −4000, and the value of E ranges from about −100 to about −10. Once the values of the parameters are obtained from the respective sensors, the coefficients can be determined with EQN. (5). As a result, values of the body slip angle estimate $\hat{\beta}$, and the yaw rate estimate $\hat{\dot{\psi}}$ of EQN. (3) can be determined. Similarly, values of the hitch force estimate ($\hat{F}_{yh}$) can also be obtained from EQN. (2) when the towing vehicle is moving.

Figure 4:
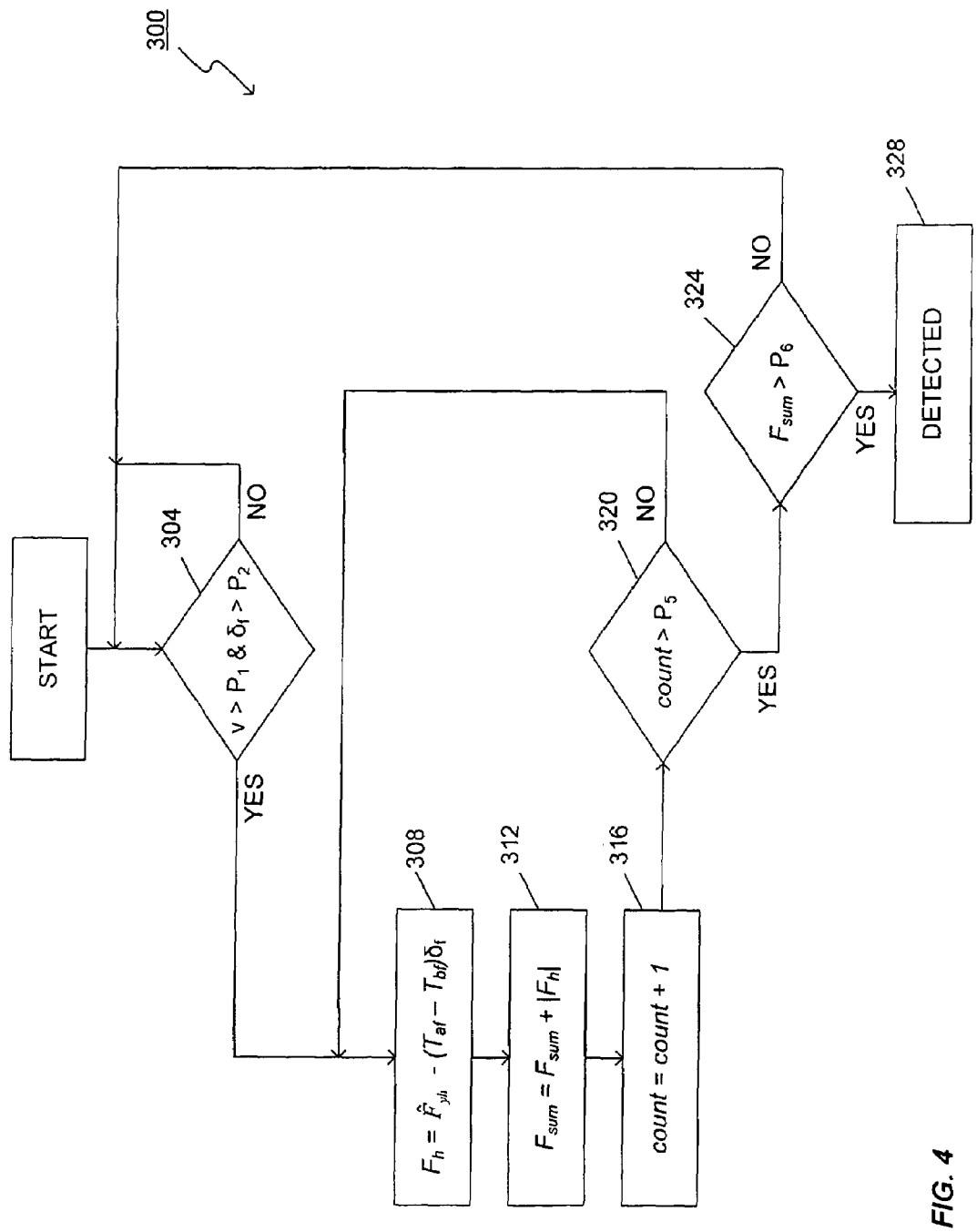
FIG. 4 is a flow chart of a trailer detection process according to an embodiment of the invention.

FIG. 4 shows a flow chart of an exemplary trailer detection process 300 that may be carried out by software, firmware, or hardware. Particularly, the trailer detection process 300 determines a trailer presence using the hitch force estimate ($\hat{F}_{yh}$) determined earlier. Since the towing vehicle model established in EQN. (1) considers a plurality of lateral dynamics, the towing vehicle model provides an opportunity to detect the trailer presence when the towing vehicle is in a lateral movement.

Particularly, at block 304, the trailer detection process 300 determines if a wheel speed of v of the towing vehicle 100 (see FIG. 1) is greater than a certain predetermined speed ($P_1$). Similarly, the process 300 also determines if an actual steering angle ($\delta_f$) of the towing vehicle 100 as sensed by the steering angle sensor 120 is greater than a predetermined steering angle threshold ($P_2$) at block 304. If the towing vehicle 100 is traveling at a wheel speed greater than the predetermined speed ($P_1$), and the actual steering angle is greater than a predetermined steering angle threshold ($P_2$), the process 300 continues at block 308. Otherwise, the process 300 continues to check wheel speed v, and the actual steering angle ($\delta_f$) at block 304. In some embodiments, the values of $P_1$ and $P_2$ are 0.75 meters per second (m/s) and 2°, respectively.

Brakes can be applied to the wheels 204, 208 of the towing vehicle 100, or the towing vehicle 100 can be accelerating in many instances. As a result, the hitch force estimate ($\hat{F}_{yh}$) can be inaccurate without a consideration of a plurality of wheel torques such as, but not limited to, driving and brake torques at the wheels. Consequently, a subsequent calculation of the hitch force estimate ($\hat{F}_{yh}$) may be necessary to adjust the hitch force estimate ($\hat{F}_{yh}$). At block 308, the hitch force estimate ($\hat{F}_{yh}$) is adjusted. Specifically, if $T_{bf}$ and $T_{af}$ are a longitudinal brake torque and a driving torque of the front wheels 204, respectively, a torque difference between the driving torque $T_{af}$ and the longitudinal brake torque $T_{bf}$ is determined. In general, the driving torque $T_{af}$ and the longitudinal brake torque $T_{bf}$ are available from the electronic stability program of the towing vehicle 100. Specifically, the driving torque $T_{af}$ comes from an engine control system while the longitudinal brake torque $T_{bf}$ is typically estimated based on a hydraulic brake pressure. A torque adjustment value is obtained by multiplying the torque difference by the value of the steering angle ($\delta_f$) at block 308. The hitch force estimate ($\hat{F}_{yh}$) is then adjusted by subtracting the torque adjustment value from the hitch force estimate ($\hat{F}_{yh}$) to obtain an updated hitch force estimate ($F_h$) at block 308. Of course, a plurality of longitudinal torques of the rear wheel 208, and a rear steering angle can also be used in some other embodiments.

Then, the updated hitch force estimate ($F_h$) can be integrated to a hitch force estimate absolute value, $F_{sum}$, by adding an absolute value of the updated hitch force estimate ($F_h$) to the value of an existing $F_{sum}$ at block 312. However, the process 300 also limits a number of times that the hitch force estimate ($\hat{F}_{yh}$) and the hitch force estimate absolute value $F_{sum}$ are updated by incrementing a counter at block 316. In this way, the duration of integration can be limited through the counter.

If the counter is less than a predetermined number ($P_5$) (block 320), the process 300 repeats updating the hitch force estimate ($\hat{F}_{yh}$) and the hitch force estimate absolute value $F_{sum}$ as described starting with block 308. Otherwise, the hitch force estimate absolute value, $F_{sum}$, is compared to a predetermined hitch force threshold ($P_6$) (block 324). If the hitch force estimate absolute value $F_{sum}$ is greater than the predetermined hitch force threshold ($P_6$), a trailer has been detected and the process 300 terminates at block 328. Otherwise, if the hitch force estimate absolute value $F_{sum}$ is less than the predetermined hitch force threshold ($P_6$), no trailer has been detected, and the process 300 is repeated starting at block 304. In some embodiments, the values of $P_5$ and $P_6$ are between 0.5 and 2 seconds, and between 1500 N to 5000 N, respectively.

Various features and advantages of the invention are set forth in the following claims.

The invention claimed is:

1. A method of detecting a vehicle trailer adapted to be connected at a hitch of a towing vehicle, the method comprising:
   modeling a plurality of dynamics of the towing vehicle;
   determining a plurality of hitch force values from the modeled dynamics of the towing vehicle;
   summing the determined hitch force values; and
   detecting a trailer presence when the sum of the hitch force values exceeds a threshold.

2. The method of claim 1, wherein the plurality of dynamics of the towing vehicle are modeled with one of a linear bicycle model, a single-track model, a two-track model, and a non-linear bicycle model.

3. The method of claim 1, wherein the plurality of dynamics of the towing vehicle comprise at least two of a wheel speed, a steering angle, a mass, a yaw rate, a body slip angle, a moment of inertia around a center point, a cornering stiffness of a front tire, a cornering stiffness of a rear tire, a distance between the front tire and the center point, a second distance between the rear tire and the center point, and a distance between the rear tire and the hitch.

4. The method of claim 1, wherein determining the plurality of hitch force values comprises:
   sensing a vehicle condition indicative of a yaw rate of the towing vehicle;
   determining a yaw rate estimate; and
   comparing the yaw rate estimate with the sensed yaw rate.

5. The method of claim 1, wherein determining the plurality of hitch force values comprises:
   sensing a vehicle condition indicative of a body slip angle of the towing vehicle;
   determining a body slip angle estimate; and
   comparing the body slip angle estimate with the sensed body slip angle.

6. The method of claim 1, further comprising finding at least one of a convergence of a yaw rate estimate, a second convergence of a body slip angle, and a convergence of the plurality of hitch force values.

7. The method of claim 1, wherein summing the determined hitch force values comprises adjusting the determined hitch force values based on a plurality of wheel torques including an engine driving torque and a brake torque.

8. The method of claim 1, wherein summing the determined hitch force values comprises integrating the determined hitch force values over a period of time.

9. A system for detecting a vehicle trailer adapted to be connected at a hitch of a towing vehicle, the system comprising:
   means for modeling a plurality of dynamics of the towing vehicle;
   means for determining a plurality of hitch force values based at least in part on the modeled dynamics;
   means for determining a sum of the determined hitch force values; and means for detecting a trailer presence when the sum exceeds a threshold.

10. The system of claim 9, wherein the plurality of dynamics are modeled with one of a linear bicycle model, a single-track model, a two-track model, and a non-linear bicycle model.

11. The system of claim 9, wherein the plurality of dynamics of the towing vehicle comprise at least two of a wheel speed, a steering angle, a mass, a yaw rate, a body slip angle, a moment of inertia around a center point, a cornering stiffness of a front tire, a cornering stiffness of a rear tire, a distance between the front tire and the center point, a second distance between the rear tire and the center point, and a distance between the rear tire and the hitch.

12. The system of claim 9, wherein means for determining a plurality of hitch force values comprises:
means for sensing a vehicle condition indicative of a yaw rate of the towing vehicle;
means for determining a yaw rate estimate; and
means for comparing the yaw rate estimate with the sensed yaw rate.

13. The system of claim 9, wherein means for determining a plurality of hitch force values comprises:
means for sensing a vehicle condition indicative of a body slip angle of the towing vehicle;
means for determining a body slip angle estimate; and
means for comparing the body slip angle estimate with the sensed body slip angle.

14. The system of claim 9, further comprising means for finding at least one of a convergence of a yaw rate estimate, a second convergence of a body slip angle, and a convergence of the plurality of hitch force values.

15. The system of claim 9, wherein the means for determining a sum of the determined hitch force values comprises means for adjusting the determined hitch force values based on a plurality of wheel torques including an engine driving torque and a brake torque.

16. The system of claim 9, wherein the means for determining a sum of the determined hitch force values comprises means for integrating the determined hitch force values over a period of time.

17. A method of detecting a vehicle trailer adapted to be connected at a hitch of a towing vehicle, the method comprising:
sensing a first vehicle condition indicative of a movement of the towing vehicle;
sensing a second vehicle condition indicative of an angle of the towing vehicle;
determining a disturbance at the hitch based on data including at least the movement of the vehicle, the angle of the vehicle, and a cornering stiffness of a front tire; and
detecting a trailer presence when the determined disturbance at the hitch is above a threshold.

18. The method of claim 17, wherein the data further includes a cornering stiffness of a rear tire.

19. The method of claim 17, wherein the data further includes a distance between a front tire and a center point.

20. The method of claim 17, wherein the data further includes a distance between a rear tire and a center point.

21. The method of claim 17, wherein the data further includes a distance between a rear tire and the hitch of the towing vehicle.

* * * * *